(12) United States Patent
Lin

(10) Patent No.: US 12,108,392 B2
(45) Date of Patent: Oct. 1, 2024

(54) METHOD OF ACKNOWLEDGMENT TRANSMISSION ON UPLINK FOR DOWNLINK DATA RECEPTIONS THROUGH A CHANNEL OF AN UNLICENSED BAND IN A RADIO ACCESS NETWORK, USER EQUIPMENT AND BASE STATION

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 330 days.

(21) Appl. No.: 17/691,037

(22) Filed: Mar. 9, 2022

(65) Prior Publication Data
US 2022/0201728 A1   Jun. 23, 2022

Related U.S. Application Data

(63) Continuation of application No. PCT/IB2019/001091, filed on Sep. 17, 2019.

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0053* (2013.01); *H04W 72/0446* (2013.01); *H04W 72/23* (2023.01)

(58) Field of Classification Search
CPC .......... H04W 72/12; H04W 72/04; H04L 5/00
See application file for complete search history.

(56) References Cited

U.S. PATENT DOCUMENTS

2022/0159692 A1* 5/2022 Lee ........................ H04L 5/0053
2022/0311556 A1* 9/2022 Singh .................... H04L 1/1854

FOREIGN PATENT DOCUMENTS

CN      103517456 A    1/2014
CN      104396174 A    3/2015
(Continued)

OTHER PUBLICATIONS

The first Office Action of corresponding European application No. 19813635.0, dated Jan. 27, 2023.
(Continued)

*Primary Examiner* — Sulaiman Nooristany
(74) *Attorney, Agent, or Firm* — Ladas & Parry, LLP

(57) ABSTRACT

The downlink data receptions include a set of one or more PDSCH receptions (PDSCH1, PDSCH2) belonging to a same group G0, scheduled by respective associated DCI elements (DCI1, DCI2) that indicate a same first slot (PUCCH1 slot) for a corresponding acknowledgement transmission, and a 'SPS' PDSCH reception (SPS-PDSCH1), for which an acknowledgment transmission is scheduled on the next of a plurality of fixed periodic slots. The UE determines that the first slot for acknowledgment transmission is the same as the next fixed periodic slot for acknowledgment transmission, generates a joint acknowledgment codebook concatenating a group codebook for group G0 including an AN element for each dynamically scheduled PDSCH receptions of the group G0 and a SPS codebook including an AN element for the 'SPS' PDSCH reception, and attempts to transmit the generated joint acknowledgment codebook on said first slot for acknowledgment transmission.

16 Claims, 4 Drawing Sheets

(51) Int. Cl.
  *H04W 72/0446* (2023.01)
  *H04W 72/1273* (2023.01)
  *H04W 72/23* (2023.01)

(56) References Cited

FOREIGN PATENT DOCUMENTS

| | | |
|---|---|---|
| CN | 109905211 A | 6/2019 |
| CN | 110168987 A | 8/2019 |
| CN | 110169000 A | 8/2019 |
| EP | 3435721 A1 | 1/2019 |
| WO | 2015139328 A1 | 9/2015 |
| WO | 2021/053364 A1 | 3/2021 |

OTHER PUBLICATIONS

The first Office Action and search report of corresponding Chinese application No. 202210447762.0, dated Sep. 11, 2023.
International Search Report (ISR) dated Jun. 15, 2020 for Application No. PCT/IB2019/001091.
ERICSSON:'Support for Shorter DL SPS Periodicities' 3GPP TSG RAN WG1 Meeting #97 R1-1906101 May 13, 2019, entire document.
Written Opinion of the International Searching Authority in International application No. PCT/IB2019/001091, mailed on Jun. 15, 2020.
The Notice of Allowance of corresponding Chinese patent application No. 202210447762.0, dated Feb. 28, 2024 with search report, and its English translation.

\* cited by examiner

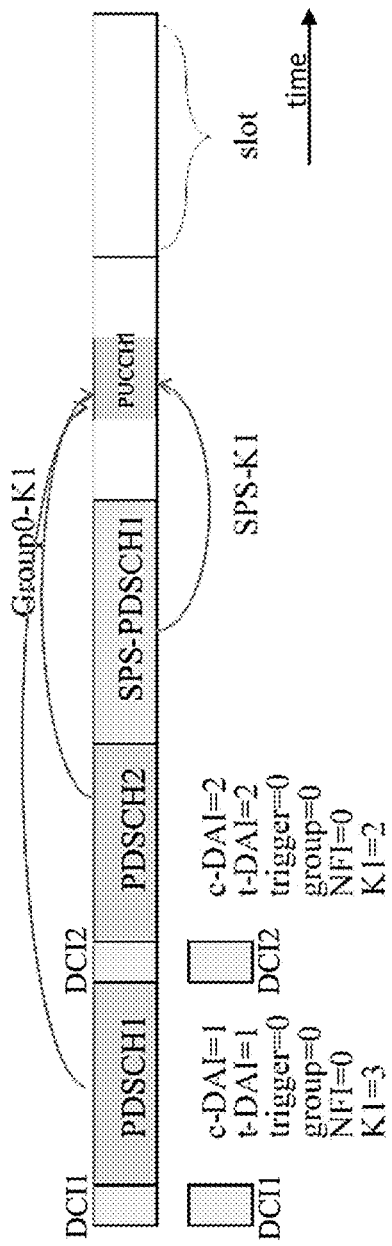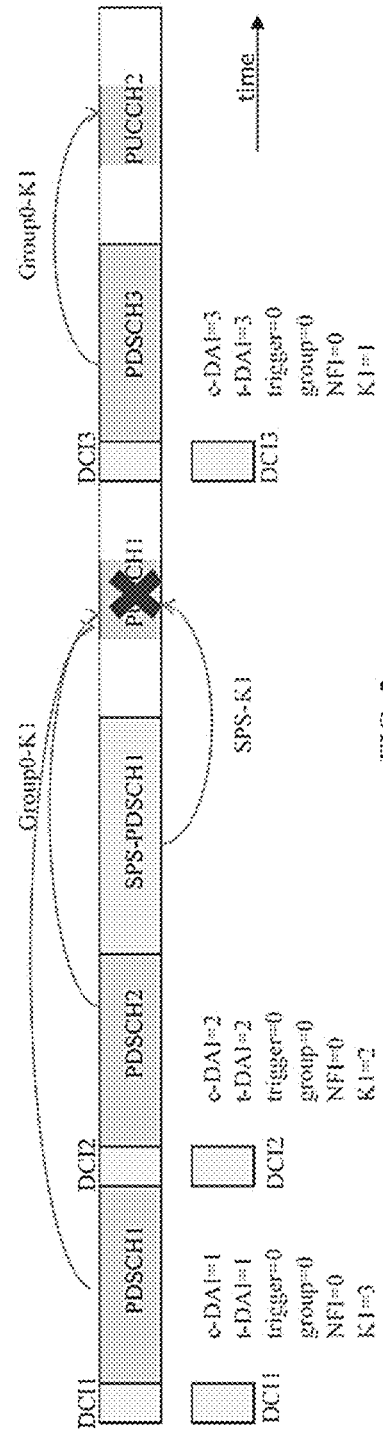
FIG. 1
FIG. 2

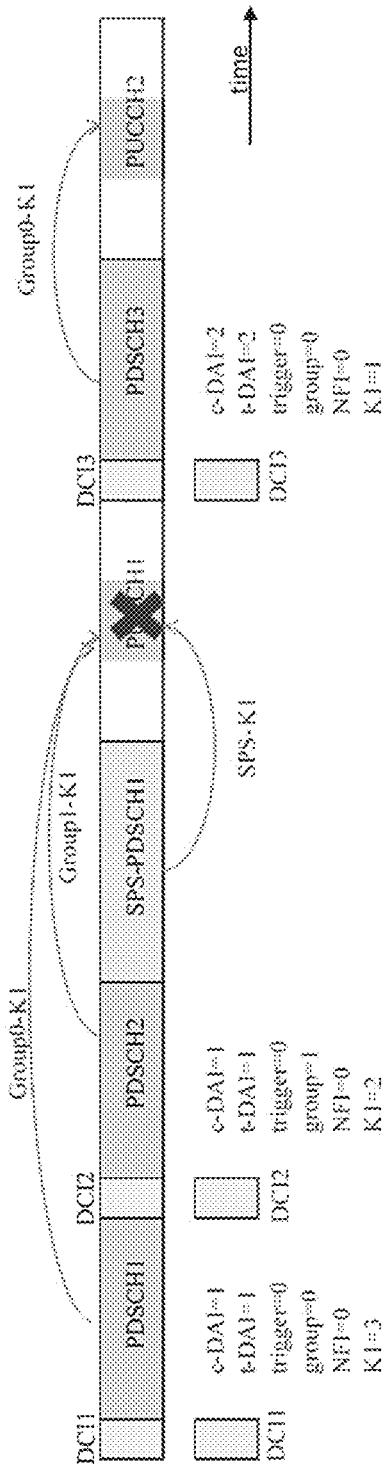
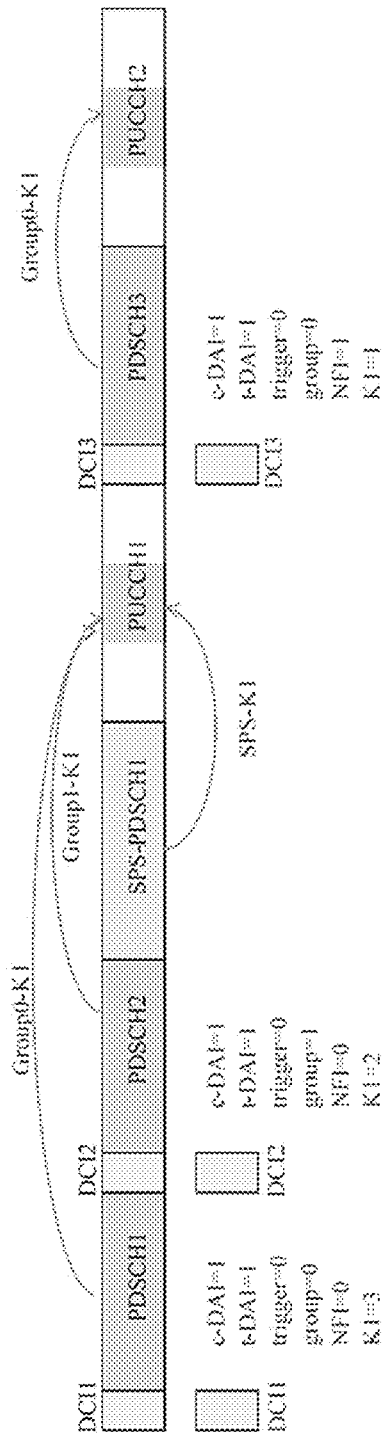
FIG. 5
FIG. 6

METHOD OF ACKNOWLEDGMENT TRANSMISSION ON UPLINK FOR DOWNLINK DATA RECEPTIONS THROUGH A CHANNEL OF AN UNLICENSED BAND IN A RADIO ACCESS NETWORK, USER EQUIPMENT AND BASE STATION

CROSS-REFERENCE TO RELATED APPLICATION

The present application is a continuation of International Application No. PCT/IB2019/001091, filed on Sep. 17, 2019, which is incorporated herein by reference in its entirety.

TECHNICAL FIELD

The present disclosure relates to the field of telecommunication, and in particular to a method of acknowledgment transmission on uplink, from a user equipment to a base station, for downlink data receptions through a channel of an unlicensed band in a radio access network, a user equipment and a base station.

The radio access network is part of a telecommunication system, for example a 5G (fifth generation) network, uses the 5G NR (New Radio) as radio access technology (RAT) defined by 3GPP. The present disclosure is more specifically applicable to 5G NR-U (NR in unlicensed spectrum).

BACKGROUND

In a 5G radio access network as defined by 3GPP standards, two types of downlink data (PDSCH) receptions can be handled by the user equipment.

The first type of downlink data receptions or PDSCHs are dynamically scheduled by the base station. It means that a downlink control information 'DCI' is transmitted for each downlink data or PDSCH reception. This DCI indicates a slot for a corresponding acknowledgment transmission. The resources in time and frequency for the transmission of these downlink PDSCHs and the corresponding uplink acknowledgment transmissions are dynamically scheduled by the base station.

The second type of resources for downlink data or PDSCH receptions are fixed and periodic. The base station needs to transmit one time a downlink control information 'DCI' for activation and, afterwards, PDSCHs are periodically transmitted from the base station to the user equipment. The corresponding downlink data receptions are fixed and periodic. In the same manner, the slots for acknowledgment transmission of PDSCHs are fixed and periodic. Such a configuration is called semi-persistent scheduling or 'SPS'.

A 5G NR-U radio access network uses an unlicensed spectrum that is a shared spectrum. In order to allow various communication systems or devices to use the unlicensed spectrum and coexist friendly, regulatory requirements have been specified and must be met by the communication systems to use the unlicensed spectrum. For example, a communication device (or user equipment) must follow a procedure "Listen Before Talk (LBT)". It means that the communication device needs to perform a channel sensing before transmitting any signal on said channel. The communication device can perform signal transmission only when the LBT outcome shows that the channel is idle. Otherwise, the communication device cannot perform the signal transmission.

In the above context, in 5G NR-U, the dynamically scheduled PDSCHs are usually grouped so that the communication device perform one acknowledgment transmission for a set (or sub-group) of a plurality of dynamically scheduled PDSCHs of the same group. The grouping is used to allow the base station to trigger a group of acknowledgement transmissions. Assume that the user equipment receives a downlink control information element DCI1 dynamically scheduling one downlink data reception PDSCH1 in a group G0 and triggering the corresponding acknowledgment transmission in a first slot, but this acknowledgment transmission for PDSCH1 is failed (for example due to a failure in the LBT procedure). Afterwards, when the user equipment receives another downlink control information element DCI2 dynamically scheduling another downlink data reception PDSCH2 in the same group G0 and triggering the corresponding acknowledgment transmission in a second slot, the user equipment detects that the previous acknowledgment transmission for the group G0 has failed, based on a specific field 'NFI' (Need Feedback Indicator) in DCI1 and DCI2, and consequently reports the acknowledgment or non-acknowledgment information for both downlink data receptions PDSCH1 and PDSCH2 of group G0 on the second slot. In this way, the acknowledgment or non-acknowledgment information for PDSCH1 can be transmitted successfully by the user equipment to the base station in a second attempt.

TECHNICAL PROBLEM

When the base station performs group-based (dynamically scheduled) PDSCH transmissions and SPS PDSCH transmissions, it may happen that a resource scheduled dynamically for an uplink acknowledgment transmission corresponding to one or more group-based (dynamically scheduled) PDSCHs and a resource scheduled in a fixed an periodic manner for an uplink acknowledgment transmission corresponding to a SPS PDSCH are on the same slot.

The present disclosure aims to define how the communication device or user equipment should handle such a situation.

SUMMARY

An object of the present disclosure is a method of acknowledgment transmission on uplink, from a user equipment to a base station, for downlink data receptions through a channel of an unlicensed band in a radio access network, wherein,
 when the downlink data receptions include
  a set of one or more dynamically scheduled downlink data receptions belonging to a same group G0, scheduled by respective associated downlink control information elements that indicate a same first slot for a corresponding acknowledgement transmission, and
  a semi-persistent scheduling 'SPS' downlink data reception, for which an acknowledgment transmission is scheduled on the next of a plurality of fixed periodic slots,
 and the user equipment determines that the first slot for acknowledgment transmission is the same as the next fixed periodic slot for acknowledgment transmission,
  the user equipment generates a joint acknowledgment codebook concatenating
   a group codebook for group G0 including an acknowledgment information element for each of the one or more dynamically scheduled downlink data receptions of the group G0 and a SPS codebook including an acknowledgment information element for the semi-persistent scheduling 'SPS' downlink data reception, and the user equipment attempts to transmit the generated joint acknowledgment codebook on said first slot for acknowledgment transmission.

Advantageously, the user equipment associates the acknowledgment transmission for the semi-persistent scheduling 'SPS' downlink data reception with the acknowledgment transmission for the group G0 and when, after expiration of the first slot for acknowledgment transmission, a downlink control information element of a new dynamically scheduled downlink data reception of said group G0 indicates a failure of the previous acknowledgment transmission for said group G0 and a second slot for a new acknowledgment transmission, the user equipment:

generates a new joint acknowledgment codebook concatenating:

a new group codebook for said group G0 incorporating an acknowledgment information element for each of the one or more previous dynamically scheduled downlink data receptions and an acknowledgment information element for the new dynamically scheduled downlink data, the SPS codebook including the acknowledgment information element for the previous semi-persistent scheduling 'SPS' downlink data reception and attempts to transmit said new joint acknowledgment codebook on the second slot for acknowledgment transmission.

Advantageously, when the downlink data receptions further include one or more dynamically scheduled downlink data receptions belonging to another group G1, scheduled by respective associated downlink control information elements that indicate the same first slot for a corresponding acknowledgement transmission, the user equipment generates the joint acknowledgment codebook by concatenating the first group codebook for the group G0, a second group codebook for the other group G1 and the SPS codebook for the semi-persistent scheduling 'SPS' downlink data reception, and attempts to transmit said joint acknowledgment codebook on the first slot for acknowledgment transmission.

Advantageously, the user equipment associates the acknowledgment transmission for the semi-persistent scheduling 'SPS' downlink data reception with the acknowledgment transmission for at least one of the two groups G0, G1 and when, after expiration of the first slot for acknowledgment transmission, a downlink control information element of a new dynamically scheduled downlink data reception of the associated group G0 or G1 indicates a failure of the previous acknowledgment transmission for said associated group G0 or G1 and a second slot for a new acknowledgment transmission, the user equipment generates a new joint acknowledgment codebook concatenating:

a new group codebook for said associated group G0 or G1 incorporating an acknowledgment information element for each of the previous dynamically scheduled downlink data receptions of said associated group G0 or G1 and an acknowledgment information element for the new dynamically scheduled downlink data reception of the associated group G0 or G1, and the SPS codebook including the acknowledgment information element for the previous semi-persistent scheduling 'SPS' downlink data reception, and attempts to transmits said new joint acknowledgment codebook on the second slot for acknowledgment transmission.

Advantageously, when, after failure of the transmission of the joint acknowledgment codebook on the first slot for acknowledgment transmission, the user equipment has a new semi-persistent scheduling 'SPS' downlink data reception and determines that the second slot for acknowledgment transmission is the same as the next fixed periodic slot for acknowledgment transmission, the user equipment adds an acknowledgment information element for the new semi-persistent scheduling 'SPS' downlink data reception in the SPS codebook concatenated in the joint acknowledgment codebook.

Advantageously, the user equipment concatenates the one or more group codebooks and the SPS codebook according to a specified order known from the base station.

Advantageously, in each codebook, that is either a group codebook for a given group or a SPS codebook, including a plurality of acknowledgment information elements for a plurality of downlink data receptions, said plurality of acknowledgment information elements are ordered according to a reception order of the plurality of downlink data receptions.

Advantageously, the user equipment determines a group identifier for each dynamically scheduled downlink data reception either from a Radio Resource Control 'RRC' configuration, or from a 3GPP specification, or from an indication of the respective associated downlink control information element.

The downlink data receptions are advantageously carried by respective PDSCHs.

The joint acknowledgment codebook are advantageously carried by a PUCCH or a PUSCH.

Advantageously, each acknowledgment information element for a corresponding downlink data reception is a bit that means an acknowledgment or a negative-acknowledgment depending on its value.

A second aspect of the present disclosure concerns a user equipment comprising a module for performing downlink data receptions, the downlink data being transmitted from a base station to the user equipment through a channel of an unlicensed band in a radio access network, and a module for performing acknowledgment transmissions uplink for the downlink data receptions, configured to control the execution of the method steps previously defined.

A third aspect of the present disclosure concerns a base station of a radio access network, comprising a module for performing downlink data transmissions to a user equipment through a channel of an unlicensed band of the radio access network, and a module for receiving acknowledgment transmissions uplink corresponding to the downlink data transmissions, configured to read a joint acknowledgment codebook as previously defined, in order to determine whether the downlink data transmissions have been successfully received by the user equipment or not.

A fourth aspect of the present disclosure concerns a computer readable medium comprising program instructions for causing a user equipment to perform the steps of the method performed by the user equipment, as previously defined.

BRIEF DESCRIPTION OF THE DRAWINGS

Other features, purposes and advantages of the present disclosure will become more explicit by means of reading the detailed statement of the non-restrictive embodiments made with reference to the accompanying drawings.

FIGS. 1 to 7 show seven exemplary embodiments of acknowledgment transmissions for downlink data receptions comprising of one or more dynamically scheduled downlink data receptions and at least one semi-persistent scheduling 'SPS' downlink data reception.

DETAILED DESCRIPTION

Figure 3:
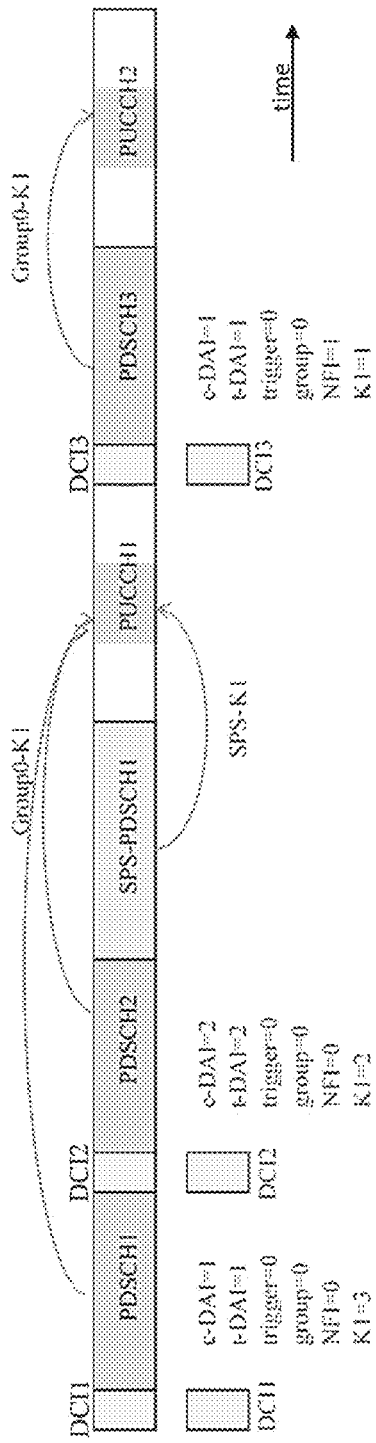

The present disclosure relates to a method of acknowledgment transmission on uplink, from a user equipment to a base station, for downlink data receptions through a channel of an unlicensed band in a radio access network, within a mobile telecommunication system. For example, the mobile telecommunication system is a 5G mobile network and the radio access network uses an unlicensed spectrum and is compliant with 5G NR-U (New Radio in unlicensed spectrum) as defined by 3GPP standards.

FIGS. 1 to 7 show various exemplary embodiments of downlink data receptions comprising dynamically scheduled downlink data (PDSCH—Physical Downlink Shared CHannel) receptions and at least one semi-persistent scheduling 'SPS' downlink data (PDSCH) reception.

Each dynamically scheduled downlink data 'PDSCH' reception is scheduled by a respective associated downlink control information element 'DCI'. The DCI, or DCI element, includes the following fields, defined in 3GPP standards:

Group ID
HARQ ID
NDI
C-DAI, T-DAI
Trigger bit
K1
NFI

The field 'HARQ ID' indicates a HARQ process which the PDSCH belongs to. The field 'NDI' indicates if the associated PDSCH transmission is a new transmission or a retransmission. The field 'Group ID' or 'Group' indicates a group identifier identifying the PDSCH group which the associated PDSCH transmission belongs to. The field 'T-DAI' represents a total number of PDSCH(s), as scheduled by the base station at the time of the current DCI. The field 'C-DAI' represents an index of the associated PDSCH in the total number of PDSCH(s). The field 'Trigger bit' or 'Trigger' indicates whether the user equipment must perform an acknowledgment transmission only for the current PDSCH group (Trigger bit=0) or for the current PDSCH group and all the other PDSCH groups (Trigger bit=1). The field 'K1' indicates that a delay between the associated downlink data (PDSCH) reception and corresponding acknowledgement transmission on uplink. This delay K1 is expressed by a number of slots. It means that the corresponding acknowledgment transmission should be performed in K1 slots from the current slot used for the downlink data (PDSCH) reception. NFI indicates whether the previous acknowledgement transmission for the same group ID has been well received by the base station or not. More precisely, NFI is a bit which value is changed from '0' to '1' or from '1' to '0' by the base station when an acknowledgment transmission for the same group ID is well received.

In the first exemplary embodiment, with reference to FIG. 1, the user equipment receives two downlink control information elements (two 'DCIS') DCI1 and DCI2, scheduling a set of two downlink data (PDSCH) receptions, PDSCH1 and PDSCH2, both belonging to a same group G0 ('group ID=0'). DCI1 and associated PDSCH1 are in the same slot. In the same manner, DCI2 and PDSCH2 are in the same slot. Moreover, the two downlink control information elements (two 'DCIS') DCI1 and DCI2 allocate a same resource, for example a PUCCH resource, in a slot ("PUCCH1 slot"), for acknowledgment transmission of the set of two downlink data receptions PDSCH1 and PDSCH2 of group G0. The resource allocation is indicated by the K1 fields of DCI1 and DCI2. In the present example, in DCI1, 'K1=3' means that the PUCCH slot is 3 slots from the current slot. In DCI2, 'K1=2' means that the PUCCH slot is 2 slots from the current slot.

Meanwhile, that is after the two downlink data (PDSCH) receptions PDSCH1 and PDSCH2 and before the PUCCH slot, the user equipment also receives a SPS PDSCH in another slot. An acknowledgment transmission corresponding to this semi-persistent scheduling SPS downlink data (PDSCH) reception is scheduled in a PUCCH resource on the next of a plurality of fixed periodic slots. These fixed periodic slots are determined by a fixed K1 indicated in a downlink data information 'DCI' for activation of the semi-persistent scheduling. The configured SPS K1 also points the user equipment to the same PUCCH slot 'PUCCH1 slot' for the acknowledgment transmission.

The user equipment determines that the PUCCH slot for acknowledgment transmission of PDSCH1 and PDSCH2 is the same as the next fixed periodic PUCCH slot of the semi-persistent scheduling, namely 'PUCCH1 slot' in FIG. 1.

In this case, the user equipment generates a joint or cascaded acknowledgment codebook concatenating a group codebook [G0 codebook] for group G0 including an acknowledgment information element for each of the two dynamically scheduled downlink data receptions PDSCH1, PDSCH2 and a SPS codebook [SPS codebook] including an acknowledgment information element for the semi-persistent scheduling 'SPS' downlink data reception SPS-PDSCH1.

The group codebook 'G0 codebook' is derived from the fields C-DAI, T-DAI and NFI.

When the user equipment received DCI1, which configuration is shown in FIG. 1, DCI1 schedules the PDSCH1 with group G0 ('group=0'). The fields C-DAI and T-DAI of DCI1 indicate the user equipment that up to the moment the user equipment receives DCI1, there is only in total one PDSCH scheduled and the PDSCH1 is the first PDSCH. The fields 'trigger=0' and 'K1=3' indicate that the acknowledgment transmission for all the PDSCHs in group G0 will be performed in K1=3 slots further from the current slot. It is assumed that 'NFI=0' is an initial value of NFI for the group G0.

When the user equipment receives DCI2, which configuration is shown in FIG. 1, DCI2 schedules the PDSCH2 with group G0 ('group=0'). The fields C-DAI and T-DAI indicate the user equipment that up to the moment the user equipment receives the DCI2, there are in total two PDSCHs scheduled and the current scheduled PDSCH2 is the second PDSCH. The fields 'trigger=0' and 'K1=2' indicate that the acknowledgment transmission for all the PDSCHs in group G0 will be performed in K1=2 slots further from the current slot.

The codebook for group G0 [G0 codebook] can be expressed by: [PDSCH1-AN, PDSCH2-AN].

The SPS codebook [SPS codebook] for the SPS-PDSCH1 can be expressed by [SPS-PDSCH1-AN].

So, the joint acknowledgment code book can be expressed as follows:

[group codebook,SPS codebook]=[G0 codebook,SPS codebook]=[PDSCH1-AN,PDSCH2-AN,SPS-PDSCH1-AN].

The expression 'PDSCHi-AN' represents an acknowledgment information element for the dynamically scheduled downlink data reception PDSCHi (with i=1, 2, etc.). The expression 'SPS-PDSCHj-AN' represents an acknowledgment information element for the SPS downlink data reception SPS-PDSCHj (with j=1, 2, etc.).

The acknowledgment information element (PDSCH-ANi or SPS-PDSCHj-AN) for a corresponding downlink data reception is an 'ACK/NACK' bit, or an 'AN' bit, that means an acknowledgment 'ACK' or a negative-acknowledgment 'NACK' depending on the value of the bit. For example, an AN bit equal to '1' means an acknowledgment (i.e. the corresponding PDSCH has been successfully received by the user equipment) and a AN bit equal to '0' means a negative-acknowledgment (i.e. the corresponding PDSCH has not been successfully received by the user equipment).

Then, the user equipment attempts to transmit the joint acknowledgment codebook on the first slot for acknowledgment transmission, in the allocated PUCCH resource. The expression "attempts to transmit" means here that the user equipment performs a 'LBT' (Listen Before Talk) procedure to sense a channel in the unlicensed spectrum and, if the channel is idle, transmits the joint acknowledgment codebook through the idle channel.

Furthermore, the user equipment associates the acknowledgment transmission for the semi-persistent scheduling 'SPS' downlink data reception (SPS PDSCH) with the acknowledgment transmission for the group G0. More precisely, the NFI of the acknowledgment transmission corresponding to the SPS PDSCH is associated with the NFI for the group G0.

More generally, according to the first exemplary embodiment, when
  the downlink data receptions include
    a set of one or more dynamically scheduled downlink data receptions belonging to a same group G0, scheduled by respective associated downlink control information elements that indicate a same first slot for a corresponding acknowledgement transmission, and
    a semi-persistent scheduling 'SPS' downlink data reception, for which an acknowledgment transmission is scheduled on the next of a plurality of fixed periodic slots,
  and the user equipment determines that the first slot for acknowledgment transmission is the same as the next fixed periodic slot for acknowledgment transmission,
  then, the user equipment generates a joint acknowledgment codebook concatenating
    a group codebook for group G0 including an acknowledgment information element for each of the one or more dynamically scheduled downlink data receptions of the group G0 and
    a SPS codebook including an acknowledgment information element for the semi-persistent scheduling 'SPS' downlink data reception, and the user equipment attempts to transmit the generated joint acknowledgment codebook on said first slot for acknowledgment transmission.

A second exemplary embodiment, with reference to FIG. 2, is based on the first exemplary embodiment, but differs from this first exemplary embodiment in that the acknowledgment transmission corresponding to the two dynamically scheduled downlink data receptions PDSCH1 and PDSCH2 and the SPS downlink data reception, in the PUCCH resource ('PUCCH1' in FIG. 2), is failed. Such a failure may be due to either a 'LBT' (Listen Before Talk) process failure (the user equipment cannot use the channel because it is not idle) or to a failure in decoding the PUCCH by the base station.

After expiration of the PUCCH1 slot, the user equipment receives a new (third) downlink control information element DCI3 scheduling a new (third) dynamically scheduled downlink data reception PDSCH3 of the same group G0. The downlink control information DIC3 indicates a failure of the previous acknowledgment transmission for said group G0 since NFI (NFI=0 in DCI3) remains unchanged compared to the previously (last) received NFI (NFI=0 in DCI2) related to group G0. The DCI3 also indicates a second slot (K1=1), with a new PUCCH resource (PUCCH2), for a new acknowledgment transmission. With the unchanged NFI and K1 in DCI3, the base station triggers a new acknowledgment transmission in a new allocated (PUCCH) resource (PUCCH2 in FIG. 2). In this way, the user equipment is informed that the group codebook for the group G0 has to be updated.

Therefore, the user equipment generates a new group codebook for group G0, 'G0 codebook' or [G0 codebook], incorporating an acknowledgment information element for each of the previous (last) dynamically scheduled downlink data receptions of group G0 (just before failed PUCCH1 in FIG. 2) and an acknowledgment information element of the new dynamically scheduled downlink data (between failed PUCCH1 and PUCCH2 in FIG. 2). More precisely, the new group codebook for group G0 [G0 codebook] can be expressed by: [PDSCH1-AN, PDSCH2-AN, PDSCH3-AN].

Moreover, since the acknowledgment transmission for the previous semi-persistent scheduling 'SPS' downlink data reception SPS-PDSCH1 is associated with the acknowledgment transmission for the group G0, it also means that the previous SPS-PDSCH acknowledgment transmission has not been successfully received by the base station. Therefore, the user equipment determines that the SPS codebook [SPS codebook] has to be retransmitted to the base station.

Thus, the user equipment generates a new joint acknowledgment codebook concatenating the new group codebook [G0 codebook]=[PDSCH1-AN, PDSCH2-AN, PDSCH3-AN], and the previous SPS codebook [SPS codebook]=[SPS-PDSCH1-AN]. Thus, the joint acknowledgment codebook can be expressed as follows:

[group codebook,SPS codebook]=[G0 codebook,SPS codebook]=[PDSCH1-AN,PDSCH2-AN, PDSCH3-AN,SPS PDSCH1-AN].

Then, the user equipment attempts to transmit the new joint acknowledgment codebook on the second slot for acknowledgment transmission, in the resource PUCCH2, as previously described.

As previously indicated in the first exemplary embodiment, the user equipment associates the acknowledgment transmission for the semi-persistent scheduling 'SPS' downlink data reception (SPS-PDSCH) with the acknowledgment transmission for the group G0. In other words, the NFI for SPS acknowledgment transmission is the NFI for the acknowledgment transmission corresponding to the downlink data receptions for the group G0.

On the basis of the above association, according to the second embodiment, when, after expiration of the first slot for acknowledgment transmission, a downlink control information element of a new dynamically scheduled downlink data reception of the group G0 indicates a failure of the previous acknowledgment transmission for the associated group G0 and a second slot for a new acknowledgment transmission, the user equipment
- generates a new joint acknowledgment codebook concatenating:
  - a new group codebook for the associated group G0 incorporating an acknowledgment information element for each of the one or more previous dynamically scheduled downlink data receptions and an acknowledgment information element for the new dynamically scheduled downlink data,
  - the SPS codebook including the acknowledgment information element for the previous semi-persistent scheduling 'SPS' downlink data reception
- and attempts to transmit the new joint acknowledgment codebook on the second slot for acknowledgment transmission.

A third exemplary embodiment, with reference to FIG. 3, is based on the second exemplary embodiment, but differs from this second exemplary embodiment in that the acknowledgment transmission corresponding to the two dynamically scheduled downlink data receptions PDSCH1 and PDSCH2 and the SPS downlink data reception, in the resource PUCCH1, is successfully received by the base station, in the first slot for acknowledgment transmission 'PUCCH1 slot'.

As previously described, the downlink control information DCI3 schedules the new (third) dynamically scheduled downlink data reception PDSCH3 and the base station triggers an acknowledgment transmission in a second slot, in a new allocated resource PUCCH2. In DCI3, the field NFI (NFI=1) is changed compared to previous NFI for group G0 (NFI=0), before the acknowledgment transmission in PUCCH1. It means that the previous acknowledgment transmission for group G0 was successfully received by the base station. So, the user equipment needs to generate and send an updated group codebook for group G0, derived by C-DAI and T-DAI, that can be expressed as follows: [G0 codebook] =[PDSCH3-AN]. The new codebook only includes an acknowledgment information for the new (third) dynamically scheduled downlink data reception PDSCH3.

Since the acknowledgment transmission for the previous semi-persistent scheduling 'SPS' downlink data reception SPS-PDSCH1 is associated with the acknowledgment transmission for the group G0 (in other words, the NFI of SPS acknowledgment transmission is associated with the NFI of group G0), it also means that the previous SPS-PDSCH acknowledgment transmission, before the acknowledgment transmission in PUCCH1, has been successfully received by the base station.

Therefore, the user equipment generates a new joint codebook that only comprises the updated group codebook for G0, and can be expressed as follows:

[group codebook]=[G0 codebook]=[PDSCH3-AN].

Then the user equipment attempts to transmit the above joint acknowledgment codebook in the second slot 'PUCCH2 slot' for acknowledgment transmission, in the new allocated PUCCH resource PUCCH2, as previously described.

Figure 4:
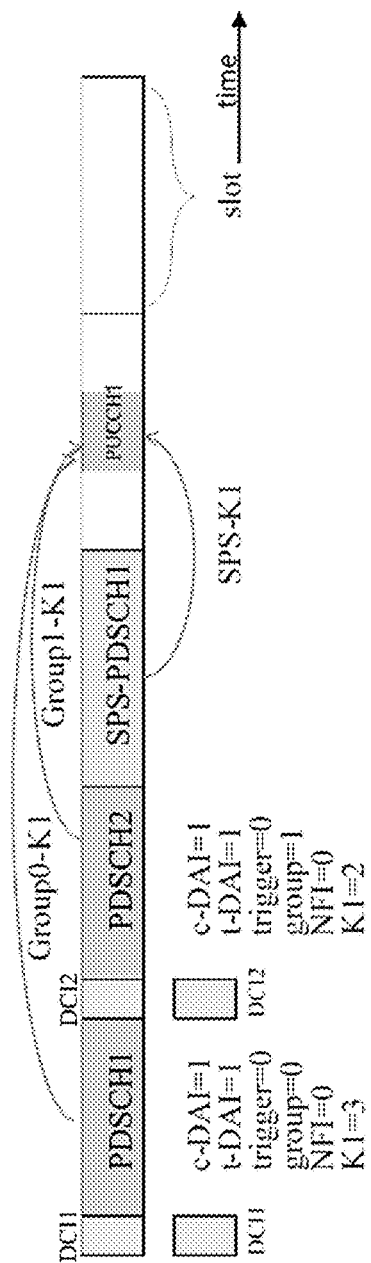

A fourth exemplary embodiment, with reference to FIG. 4, is based on the first exemplary embodiment, but differs from this first exemplary embodiment in that the first and second dynamically scheduled downlink data receptions PDSCH1 and PDSCH2 belong to two different groups. In this example, only one PDSCH is scheduled for each of the two groups. However, one or more PDSCHs may be scheduled for each of the two groups.

Thus, the fourth exemplary embodiment is similar to the first exemplary embodiment but the downlink control information DCI2 dynamically schedules the data reception PDSCH2 in a different group, namely the group G1.

In this fourth exemplary embodiment, both group acknowledgement transmissions are triggered to be sent on the same slot, in the same PUCCH resource, by the respective K1 values of DCI1 and DCI2. This slot is the PUCCH1 slot in FIG. 4.

In that case, the user equipment generates a joint acknowledgment codebook by concatenating a first group codebook for the group G0, a second group codebook for the other group G1 and the SPS codebook for the semi-persistent scheduling 'SPS' downlink data reception. The first group codebook for G0 and the second group codebook for group G1, once concatenated, form a group codebook that can be expressed as follows:

[group codebook]=[G0 codebook,G1 codebook]= [PDSCH1-AN,PDSCH2-AN]

The joint acknowledgment codebook can be expressed as follows:

[group codebook,SPS codebook]=[G0 codebook,G1 codebook,SPS codebook]=[PDSCH1-AN, PDSCH2-AN,SPS-PDSCH1-AN]

Furthermore, the user equipment associates the acknowledgment transmission for the semi-persistent scheduling 'SPS' downlink data reception SPS-PDSCH1 with the acknowledgment transmission for at least one of the two groups G0, G1 (that is either group G0, or group G1 or both groups G0 and G1). In other words, the NFI of SPS acknowledgment transmission is associated to the NFI of acknowledgment transmission for group G0 or for group G1 or for both groups G0 and G1.

Then, the user equipment attempts to transmit the joint acknowledgment codebook on the first slot for acknowledgment transmission, in the PUCCH1 resource, as previously described.

Thus, according to the fourth embodiment, when the downlink data receptions include one or more dynamically scheduled downlink data receptions belonging to a group G0 (for example PDSCH1 in FIG. 4), and one or more dynamically scheduled downlink data receptions belonging to another group G1 (for example PDSCH2 in FIG. 4), all scheduled by respective associated downlink control information elements that indicate the same first slot for acknowledgement transmission (PUCCH1 slot in FIG. 4), and further includes a SPS downlink data reception (for example SPS-PDSCH1 in FIG. 4), the user equipment generates the joint acknowledgment codebook by concatenating a first group codebook for the group G0, a second group codebook for the other group G1 and the SPS codebook for the semi-persistent scheduling 'SPS' downlink data reception, and attempts to transmit this generated joint acknowledgment codebook on the first slot for acknowledgment transmission.

A fifth exemplary embodiment, with reference to FIG. 5, is based on the fourth exemplary embodiment, but differs from this fourth exemplary embodiment in that the acknowledgment transmission corresponding to the two dynamically scheduled downlink data receptions PDSCH1 and PDSCH2 and the SPS downlink data reception, in the PUCCH resource ('PUCCH1' in FIG. 5), is failed. As previously indicated, the failure may be due to either a 'LBT' (Listen Before Talk) process failure or a failure in decoding the PUCCH by the base station.

After expiration of the 'PUCCH1 slot', the user equipment receives a new (third) downlink control information element DCI3 scheduling a new (third) dynamically scheduled downlink data reception PDSCH3 of the group G0. The downlink control information DIC3 indicates a failure of the previous acknowledgment transmission for said group G0 since NFI (NFI=0 in DCI3) remains unchanged compared to the previously (last) received NFI related to group G0 (NFI=0 in DCI1). The DCI3 also indicates a second slot for acknowledgment transmission (K1=1), with a new PUCCH resource 'PUCCH2', for a new acknowledgment transmission. With the unchanged NFI for group G0 and the field K1 in DCI3, the base station triggers a new acknowledgment transmission in a new allocated (PUCCH) resource (PUCCH2 in FIG. 5). In this way, the user equipment is informed that the group codebook for group G0 has to be updated.

Therefore, the user equipment generates a new group codebook for group G0, 'G0 codebook' or [G0 codebook], incorporating an acknowledgment information element for the (or each of the) previous (last) dynamically scheduled downlink data reception(s) of group G0 (just before failed PUCCH1 in FIG. 5) and an acknowledgment information element for the new dynamically scheduled downlink data (between failed PUCCH1 and PUCCH2 in FIG. 5). More precisely, the new group codebook for group G0 [G0 codebook] can be expressed by: [G0 codebook]=[PDSCH1-AN, PDSCH3-AN].

It is assumed here that the acknowledgment transmission for the previous semi-persistent scheduling 'SPS' downlink data reception SPS-PDSCH1 is associated with the acknowledgment transmission for both group G0 and G1. In other words, the NFI of SPS acknowledgment transmission is associated to the NFIs of acknowledgment transmission for both groups G0 and G1.

Therefore, NFI=0 for group G0 in DCI3 also means that the previous SPS-PDSCH acknowledgment transmission corresponding to SPS-PDSCH1 has not been successfully received by the base station. Therefore, the user equipment determines that the SPS codebook [SPS codebook] has to be retransmitted to the base station.

Thus, the user equipment generates a new joint acknowledgment codebook concatenating the new group codebook [G0 codebook]=[PDSCH1-AN, PDSCH3-AN], and the previous SPS codebook [SPS codebook]=[SPS-PDSCH1-AN]. So, the joint acknowledgment codebook can be expressed as follows:

[group codebook,SPS codebook]=[G0 codebook,SPS codebook]=[PDSCH1-AN,PDSCH3-AN,SPS PDSCH1-AN].

If we assume that DCI3 indicates the group G1 (instead of group G0), then the joint acknowledgment codebook is as follows:

[group codebook,SPS codebook]=[G1 codebook,SPS codebook]=[PDSCH2-AN,PDSCH3-AN,SPS PDSCH1-AN].

If the DCI3 sets the group G0 but indicates 'trigger bit=1' (or 'trigger=1'), the user equipment must perform an acknowledgment transmission for the current PDSCH group (that is group G0 in FIG. 5) and all any other PDSCH group (that is also group G1 in FIG. 5). In that case, the joint acknowledgment codebook is as follows:

[group codebook,SPS codebook]=[G0 codebook,G1 codebook,SPS codebook]=[PDSCH1-AN, PDSCH3-AN,PDSCH2-AN,SPS PDSCH1-AN].

Then, the user equipment attempts to transmit the new joint acknowledgment codebook on the second slot for acknowledgment transmission, in the resource PUCCH2, as previously described.

So, according to the fifth exemplary embodiment, when, after expiration of the first slot for acknowledgment transmission (PUCCH1 slot in FIG. 5), a downlink control information element (DCI3 in FIG. 5) of a new dynamically scheduled downlink data reception (PDSCH3 in FIG. 5) of the associated group G0 (or G1) indicates a failure of the previous acknowledgment transmission for said associated group G0 (or G1) and a second slot (PUCCH2 slot in FIG. 5) for a new acknowledgment transmission, the user equipment
  generates a new joint acknowledgment codebook concatenating:
    a new (or updated) group codebook for said associated group G0 (or G1) incorporating an acknowledgment information element for the or each of the previous dynamically scheduled downlink data reception(s) (PDSCH1 in the example FIG. 5) of said associated group G0 (or G1) and an acknowledgment information element for the new dynamically scheduled downlink data reception (PDSCH3 in the example FIG. 5) of the associated group G0 (or G1),
    the SPS codebook including the acknowledgment information element for the previous semi-persistent scheduling 'SPS' downlink data reception (SPS-PDSCH1 in FIG. 5).

Then, the user equipment attempts to transmit this new joint acknowledgment codebook on the second slot (PUCCH2 slot in FIG. 5).

A sixth exemplary embodiment, with reference to FIG. 6, is based on the fifth exemplary embodiment, but differs from this fifth exemplary embodiment in that the acknowledgment transmission corresponding to the two dynamically scheduled downlink data receptions PDSCH1 and PDSCH2 and the SPS downlink data reception, in the resource PUCCH1, is successfully received by the base station, in a first slot for acknowledgment transmission.

The downlink control information DCI3 schedules the new (third) dynamically scheduled downlink data reception PDSCH3 and the base station triggers an acknowledgment transmission in a second slot, in a new allocated resource PUCCH2. In DCI3, the field NFI (NFI=1) is changed compared to previous NFI (before PUCCH1) for group G0. It means that the previous acknowledgment transmission for group G0 was successfully received by the base station. So, the user equipment needs to generate and send an updated group codebook for group G0, derived by C-DAI and T-DAI, that can be expressed as follows: [G0 codebook]= [PDSCH3-AN]. In that case, the user equipment generates a joint acknowledgment codebook that only contains the group codebook for group G0 and can be expressed as follows:

[group codebook]=[G0 codebook]=[PDSCH3-AN]

Figure 7:
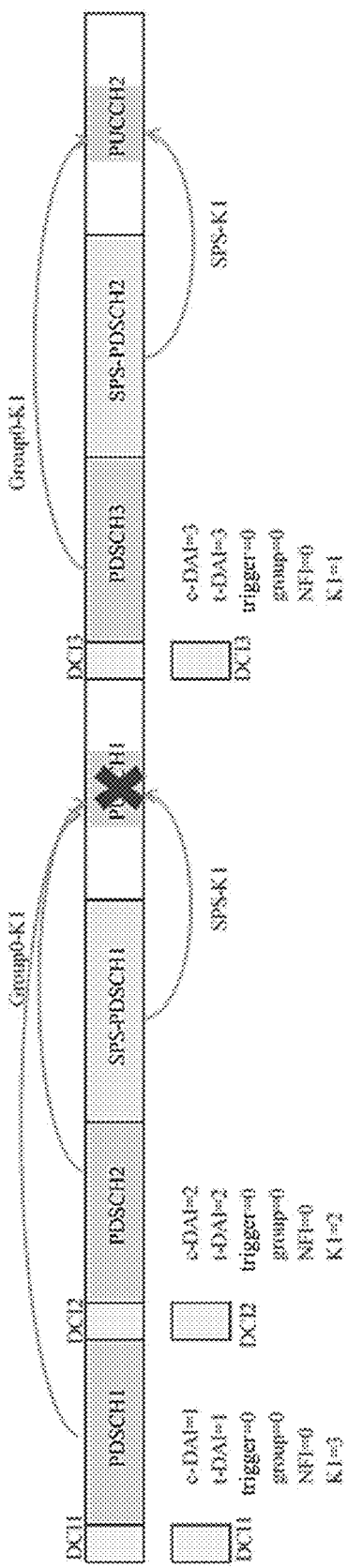

A seventh exemplary embodiment, with reference to FIG. 7, is based on the second embodiment, but differs from this second embodiment in that there is a second SPS downlink data (PDSCH) reception, 'SPS-PDSCH2', after the PUCCH1 slot, and the corresponding acknowledgment transmission is scheduled on the next 'SPS' fixed and periodic slot that is the same slot as the second slot for the acknowledgment transmission corresponding to PDSCH3, and in the same PUCCH resource 'PUCCH2'.

Thus, in the seventh exemplary embodiment, after failure of the transmission of the joint acknowledgment codebook on the first slot for acknowledgment transmission, in the resource PUCCH1, there is a new semi-persistent scheduling 'SPS' downlink data reception SPS-PDSCH2 and the user equipment determines that the slot for the acknowledgment transmission corresponding to PDSCH3 is the same as the next SPS fixed periodic slot for the acknowledgment transmission corresponding to SPS-PDSCH2.

In that case, the user equipment adds an acknowledgment information element for the new semi-persistent scheduling 'SPS' downlink data reception SPS-PDSCH2 in the SPS codebook concatenated in the joint acknowledgment codebook.

Therefore, the joint acknowledgment codebook is as follows:

[group codebook,SPS codebook]=[G0 codebook,SPS codebook]=[PDSCH1-AN,PDSCH2-AN, PDSCH3-AN,SPS PDSCH1-AN,SPS-PDSCH2-AN].

Then the user equipment attempts to transmit the above joint acknowledgment codebook in the second slot for acknowledgment transmission, in the PUCCH resource PUCCH2, as previously described.

More generally, according to the seventh exemplary embodiment, when, after failure of the transmission of the joint acknowledgment codebook on the first slot for acknowledgment transmission, the user equipment has a new dynamically scheduled downlink data reception for the group G0 and a new semi-persistent scheduling 'SPS' downlink data reception and determines that the second slot is the same as the next 'SPS' fixed periodic slot, the user equipment adds an acknowledgment information element for the new semi-persistent scheduling 'SPS' downlink data reception in the SPS codebook concatenated in the joint acknowledgment codebook. The seventh exemplary embodiment is applicable to the second and fifth exemplary embodiments previously described.

In the preceding described exemplary embodiments, the user equipment concatenates the one or more group codebooks and the SPS codebook according to a specified order that is known from the base station, in order to generate the joint acknowledgment codebook. This order can be different from the one previously described, as long as the user equipment and the base station both know this order.

In each codebook, that is either a group codebook for a given group or a SPS codebook, including a plurality of acknowledgment information elements for a plurality of downlink data receptions, these acknowledgment information elements are advantageously ordered according to a reception order of the plurality of downlink data receptions.

In the previous description, the user equipment determines a group identifier for each dynamically scheduled downlink data reception from an indication of the associated downlink control information element. Alternatively, the group identifier is determined from either a Radio Resource Control 'RRC' configuration or from a 3GPP specification.

Instead of transmitting the joint acknowledgment codebook in a PUCCH resource, the joint acknowledgment codebook can be alternatively transmitted in a PUSCH resource and in any other uplink control channel.

As previously indicated, in the joint acknowledgment codebook, each acknowledgment information element for a corresponding downlink data reception is a bit that means an acknowledgment or a negative-acknowledgment depending on its value.

The present disclosure also concerns a user equipment comprising:
- a module for performing downlink data receptions, the downlink data being transmitted from a base station to the user equipment through a channel of an unlicensed band in a radio access network, and
- a module for performing acknowledgment transmissions uplink for the downlink data receptions through said channel, configured to control the execution of those of the steps previously described in the present description that are performed by the user equipment.

The present disclosure also concerns a base station of the radio access network, comprising:
- a module for performing downlink data transmissions to a user equipment through a channel of an unlicensed band in a radio access network, and
- a module for receiving acknowledgment transmissions uplink corresponding to the downlink data transmissions, configured to read a joint acknowledgment codebook as disclosed in the preceding description, in order to determine whether the downlink data transmissions have been successfully received by the user equipment or not.

The present disclosure also concerns a computer readable medium comprising program instructions for causing a user equipment to perform the steps of the method performed by the user equipment, as previously described.

In the above description, the mobile telecommunication system is a 5G mobile network comprising a 5G NR-U (New Radio in unlicensed spectrum) access network. The present disclosure can be applied to other mobile networks, in particular to mobile network of any further generation cellular network technology (6G, etc.).

List of abbreviations in the description and drawings:

| Acronym | Full name |
| --- | --- |
| NR | New Radio |
| NR-U | New Radio-Unlicensed |
| BS | Base Station |
| UE | User Equipment |
| PDSCH | Physical Downlink Shared CHannel |
| DCI | Downlink Control Information |
| SPS | Semi-Persistent Scheduling |
| LBT | Listen Before Talk |
| AN | Ack/Nack |
| PUCCH | Physical Uplink Control CHannel |
| PUSCH | Physical Uplink Shared CHannel |
| C-DAI | Counter Downlink Assignment Indicator |
| T-DAI | Total Downlink Assignment Indicator |
| NFI | Need Feedback Indicator |

What is claimed is:

1. A method of acknowledgment transmission on uplink, from a user equipment to a base station, for downlink data receptions through a channel of an unlicensed band in a radio access network,
wherein,
when the downlink data receptions include
a set of one or more dynamically scheduled downlink data receptions (PDSCH1, PDSCH2; PDSCH1) belonging to a same group G0, scheduled by respective associated downlink control information elements (DCI1, DCI2) that indicate a same first slot (PUCCH1 slot) for a corresponding acknowledgement transmission, and
a semi-persistent scheduling 'SPS' downlink data reception (SPS-PDSCH1), for which an acknowledgment transmission is scheduled on the next of a plurality of fixed periodic slots,
and the user equipment determines that the first slot (PUCCH1 slot) for acknowledgment transmission is the same as the next fixed periodic slot for acknowledgment transmission,
the user equipment generates a joint acknowledgment codebook concatenating
a group codebook for group G0 including an acknowledgment information element for each of the one or more dynamically scheduled downlink data receptions of the group G0 and
a SPS codebook including an acknowledgment information element for the semi-persistent scheduling 'SPS' downlink data reception,
and the user equipment attempts to transmit the generated joint acknowledgment codebook on said first slot for acknowledgment transmission;
when the downlink data receptions further include one or more dynamically scheduled downlink data receptions (PDSCH2) belonging to another group G1, scheduled by respective associated downlink control information elements (DCI2) that indicate the same first slot (PUCCH1 slot) for a corresponding acknowledgement transmission,
the user equipment generates the joint acknowledgment codebook by concatenating the first group codebook for the group G0, a second group codebook for the other group G1 and the SPS codebook for the semi-persistent scheduling 'SPS' downlink data reception (SPS-PDSCH1), and attempts to transmit said joint acknowledgment codebook on the first slot (PUCCH1 slot) for acknowledgment transmission.

2. The method according to claim 1, wherein, the user equipment associates the acknowledgment transmission for the semi-persistent scheduling 'SPS' downlink data reception (SPS-PDSCH1) with the acknowledgment transmission for at least one of the two groups G0, G1 and when, after expiration of the first slot (PUCCH1 slot) for acknowledgment transmission, a downlink control information element (DCI3) of a new dynamically scheduled downlink data reception (PDSCH3) of the associated group G0 or G1 indicates a failure of the previous acknowledgment transmission for said associated group G0 or G1 and a second slot (PUCCH2 slot) for a new acknowledgment transmission, the user equipment
generates a new joint acknowledgment codebook concatenating:
a new group codebook for the associated group G0 or G1 incorporating an acknowledgment information element for each of the previous dynamically scheduled downlink data receptions (PDSCH1) of said associated group G0 or G1 and an acknowledgment information element for the new dynamically scheduled downlink data reception (PDSCH3) of the associated group G0 or G1, and
the SPS codebook including the acknowledgment information element for the previous semi-persistent scheduling 'SPS' downlink data reception (SPS-PDSCH1),
and attempts to transmits said new joint acknowledgment codebook on the second slot (PUCCH2 slot) for acknowledgment transmission.

3. The method according to claim 1, wherein when, after failure of the transmission of the joint acknowledgment codebook on the first slot (PUCCH1 slot) for acknowledgment transmission, the user equipment has a new semi-persistent scheduling 'SPS' downlink data reception (SPS-PDSCH2) and determines that the second slot (PUCCH2 slot) for acknowledgment transmission is the same as the next fixed periodic slot, the user equipment adds an acknowledgment information element for the new semi-persistent scheduling 'SPS' downlink data reception (SPS-PDSCH2) in the SPS codebook concatenated in the joint acknowledgment codebook.

4. The method according to claim 1, wherein the user equipment concatenates the one or more group codebooks and the SPS codebook according to a specified order known from the base station.

5. The method according to claim 1, wherein, in each codebook, that is either a group codebook for a given group or a SPS codebook, including a plurality of acknowledgment information elements for a plurality of downlink data receptions, said plurality of acknowledgment information elements are ordered according to a reception order of the plurality of downlink data receptions.

6. The method according to claim 1, wherein the user equipment determines a group identifier for each dynamically scheduled downlink data reception either from a Radio Resource Control 'RRC' configuration, or from a 3GPP specification, or from an indication of the respective associated downlink control information element.

7. The method according to claim 1, wherein the downlink data receptions are carried by respective Physical Downlink Shared Channels (PDSCHs).

8. The method according to claim 1, wherein the joint acknowledgment codebook is carried by a Physical Uplink Control Channel (PUCCH) or a Physical Uplink Shared Channel (PUSCH).

9. The method according to claim 1, wherein each acknowledgment information element for a corresponding downlink data reception is a bit that means an acknowledgment or a negative-acknowledgment depending on its value.

10. A user equipment, comprising a processor and a memory, wherein program instructions are stored in the memory, and the processor, when executing the program instructions, is configured to:
when downlink data receptions include
a set of one or more dynamically scheduled downlink data receptions (PDSCH1, PDSCH2; PDSCH1) belonging to a same group G0, scheduled by respective associated downlink control information elements (DCI1, DCI2) that indicate a same first slot (PUCCH1 slot) for a corresponding acknowledgement transmission, and
a semi-persistent scheduling 'SPS' downlink data reception (SPS-PDSCH1), for which an acknowledgment transmission is scheduled on the next of a plurality of fixed periodic slots,
and the processor determines that the first slot (PUCCH1 slot) for acknowledgment transmission is the same as the next fixed periodic slot for acknowledgment transmission,
generate a joint acknowledgment codebook concatenating
a group codebook for group G0 including an acknowledgment information element for each of the one or more dynamically scheduled downlink data receptions of the group G0 and a SPS codebook including an acknowledgment information element for the semi-persistent scheduling 'SPS' downlink data reception, and attempt to transmit the generated joint acknowledgment codebook on said first slot for acknowledgment transmission;

wherein the processor is further configured to:

when the downlink data receptions further include one or more dynamically scheduled downlink data receptions (PDSCH2) belonging to another group G1, scheduled by respective associated downlink control information elements (DCI2) that indicate the same first slot (PUCCH1 slot) for a corresponding acknowledgement transmission, generate the joint acknowledgment codebook by concatenating the first group codebook for the group G0, a second group codebook for the other group G1 and the SPS codebook for the semi-persistent scheduling 'SPS' downlink data reception (SPS-PDSCH1), and attempt to transmit said joint acknowledgment codebook on the first slot (PUCCH1 slot) for acknowledgment transmission.

11. The user equipment according to claim 10, wherein the processor is further configured to:

associate the acknowledgment transmission for the semi-persistent scheduling 'SPS' downlink data reception (SPS-PDSCH1) with the acknowledgment transmission for at least one of the two groups G0, G1, and when, after expiration of the first slot (PUCCH1 slot) for acknowledgment transmission, a downlink control information element (DCI3) of a new dynamically scheduled downlink data reception (PDSCH3) of the associated group G0 or G1 indicates a failure of the previous acknowledgment transmission for said associated group G0 or G1 and a second slot (PUCCH2 slot) for a new acknowledgment transmission, generate a new joint acknowledgment codebook concatenating:

a new group codebook for the associated group G0 or G1 incorporating an acknowledgment information element for each of the previous dynamically scheduled downlink data receptions (PDSCH1) of said associated group G0 or G1 and an acknowledgment information element for the new dynamically scheduled downlink data reception (PDSCH3) of the associated group G0 or G1, and the SPS codebook including the acknowledgment information element for the previous semi-persistent scheduling 'SPS' downlink data reception (SPS-PDSCH1), and attempt to transmits said new joint acknowledgment codebook on the second slot (PUCCH2 slot) for acknowledgment transmission.

12. The user equipment according to claim 11, wherein the processor is further configured to:

when, after failure of the transmission of the joint acknowledgment codebook on the first slot (PUCCH1 slot) for acknowledgment transmission, the processor has a new semi-persistent scheduling 'SPS' downlink data reception (SPS-PDSCH2) and determines that the second slot (PUCCH2 slot) for acknowledgment transmission (PUCCH2 slot) is the same as the next fixed periodic slot, add an acknowledgment information element for the new semi-persistent scheduling 'SPS' downlink data reception (SPS-PDSCH2) in the SPS codebook concatenated in the joint acknowledgment codebook.

13. The user equipment according to claim 10, wherein the processor is further configured to:

concatenate the one or more group codebooks and the SPS codebook according to a specified order known from the base station.

14. The user equipment according to claim 10, wherein the processor is further configured to:

determine a group identifier for each dynamically scheduled downlink data reception either from a Radio Resource Control 'RRC' configuration, or from a 3GPP specification, or from an indication of the respective associated downlink control information element.

15. The user equipment according to claim 10, wherein the downlink data receptions are carried by respective Physical Downlink Shared Channels (PDSCHs).

16. The user equipment according to claim 10, wherein the joint acknowledgment codebook is carried by a Physical Uplink Control Channel (PUCCH) or a Physical Uplink Shared Channel (PUSCH).

* * * * *